United States Patent [19]

Ernst et al.

[11] Patent Number: 4,990,767
[45] Date of Patent: Feb. 5, 1991

[54] POSITION MEASURING APPARATUS WITH MULTIPLE SCANNING LOCATIONS

[75] Inventors: Alfons Ernst; Walter Schmitt; Norbert Huber, all of Traunreut, Fed. Rep. of Germany

[73] Assignee: Dr. Johannes Heidenhain GmbH, Traunreut, Fed. Rep. of Germany

[21] Appl. No.: 222,833

[22] Filed: Jul. 22, 1988

[30] Foreign Application Priority Data

Aug. 7, 1987 [DE] Fed. Rep. of Germany ....... 3726260

[51] Int. Cl.⁵ .................... G01D 5/38; G01P 3/486
[52] U.S. Cl. ........................... 250/231.16; 250/231.14; 341/11; 341/13
[58] Field of Search ........ 250/231 SE, 237 G, 231.14, 250/231.16; 33/125 R, 125 A, 125 C, 706, 707, 708; 324/173-175; 341/13, 14, 11

[56] References Cited

U.S. PATENT DOCUMENTS 4,567,462 1/1986 Leiby ..................................... 341/13
4,580,046 4/1986 Sasaki et al. ................... 250/231 SE
4,580,047 4/1986 Sasaki ........................... 250/231 SE
4,779,211 10/1988 March ........................... 250/231 SE

FOREIGN PATENT DOCUMENTS

2711593A1 9/1978 Fed. Rep. of Germany .
3527128A1 1/1987 Fed. Rep. of Germany .

Primary Examiner—Edward P. Westin
Attorney, Agent, or Firm—Willian Brinks Olds Hofer Gilson & Lione

[57] ABSTRACT

A measuring device is provided in which a graduated plate is scanned in at least two scanning locations. The scanning signals from the different scanning locations are transmitted to a testing circuit which determines whether the phase displacement between the scanning signals exceeds a limit value. If the limit value is exceeded, one of the scanning locations is weighted higher than the other. The weighting is implemented by increasing the components of the signals from one scanning location while decreasing the components from the signals from the other scanning location.

7 Claims, 5 Drawing Sheets a)

b)

a) $\alpha = 0°$ b) $\alpha = 30°$ c) $\alpha = 60°$ d) $\alpha = 80°$ e) $\alpha = 90°$

POSITION MEASURING APPARATUS WITH MULTIPLE SCANNING LOCATIONS

BACKGROUND OF THE INVENTION

The present invention relates generally to position measuring devices and more specifically to position measuring devices which include a measurement embodiment which is scanned at multiple locations.

It is known in the art that position measuring devices provide more accurate measurements if the position measurement embodiment of the measuring device is scanned at multiple scanning locations with multiple scanning devices.

Such position measuring devices are taught for example, in U.S. Pat. Nos. 4,580,046 and 4,580,047. Each of these two references discloses an arrangement in which a rotational drive is scanned at two locations and in which the velocity of the components to be measured and the phase displacement between the two measuring signals is monitored by a timed testing circuit.

German DE-A1-35 27 128 also discloses a rotational measuring device which includes two scanning locations. In the arrangement disclosed by this reference, the amplitude of the measuring signals generated at the scanning locations is kept constant. To implement the double-scanning, the rotational drive is provided with slit gratings which are scanned by two signal generators which are offset spatially by 180° from each other. Each signal generator generates two sine voltage signals offset by 90° relative to one another. The angle of rotation of the rotational drive is determined from an average of these two signals.

Another double-scanning arrangement is taught by German DE-A1-27 11 593 which discloses an angular displacement measuring device which includes two sets of slit gratings on an interruptor wheel. The sets of gratings are disposed such that each set is 180° apart from the other on the interruptor wheel. The gratings are scanned by two signal generators which are also spatially offset by 180°. The output signals in this arrangement are also averaged to provide a measurement value.

These double-scanning arrangements reduce measurement inaccuracies which are caused by eccentricity tolerances and mechanical graduation errors. In such double-scanning arrangements, phase displacements between the scanning signals provided from the two scanning locations can be tolerated to a certain degree. However, if the phase displacement exceeds a set limit, the resulting signals may become too small or the signals may even mutually cancel each other entirely. This condition is explained in more detail below.

The danger of exceeding the displacement limit is most prevalent if these double-scanning devices are disposed in a location which is subjected to high accelerations such as accelerations caused by impacts or strong vibrations. Under these conditions, the double scanning—which normally provides improved measuring accuracy—is actually disadvantageous since the signals from a first scanning location can either partially or entirely cancel the signals from the other scanning location leading to erroneous measurements.

Therefore, in view of the above, it is an object of the present invention to provide a position measuring apparatus which will under normal conditions advantageously use multiple scanning to provide accurate measurements.

It is another object of the present invention to provide a position measuring apparatus which incorporates multiple scanning locations and which will provide reliable measurement readings even when used on devices subjected to shocks or other jarring motions.

SUMMARY OF THE INVENTION

To achieve the foregoing and other objects of the invention and in accordance with the purposes of the present invention, the position measuring apparatus of the present invention may include a measurement embodiment and a plurality of scanning devices. The scanning devices are arranged to define a plurality of different scanning locations on the measurement embodiment and generate scanning signals corresponding to each of the various scanning locations. The position measuring apparatus further includes an evaluating circuit which evaluates the scanning signals from the different scanning locations. The evaluating circuit also includes a testing circuit which determines the occurrence of predefined conditions. Means are provided to unequally weight the scanning signals from the different scanning locations when the testing circuit detects that the phase displacement between the scanning signals from different scanning locations and/or the amplitudes of the sum of the signals from different scanning locations exceeds an inadmissible tolerance range.

Thus, the present invention provides a position measuring apparatus which may be used to correct errors caused by eccentricity tolerances in rotating devices and/or by mechanical graduation errors and which will provide reliable measurements despite exposure of the device to jolting or jarring motions.

Additional objects, advantages and novel features of the invention will be set for in part in the description which follows, and in part will become apparent to those skilled in the art upon examination of the following or may be learned by practice of the invention. The objects and advantages of the invention may be obtained by means of the instrumentalities and combinations particularly pointed out in the appended claims.

DETAILED DESCRIPTION OF THE PRESENTLY PREFERRED EMBODIMENTS

Figure 1:
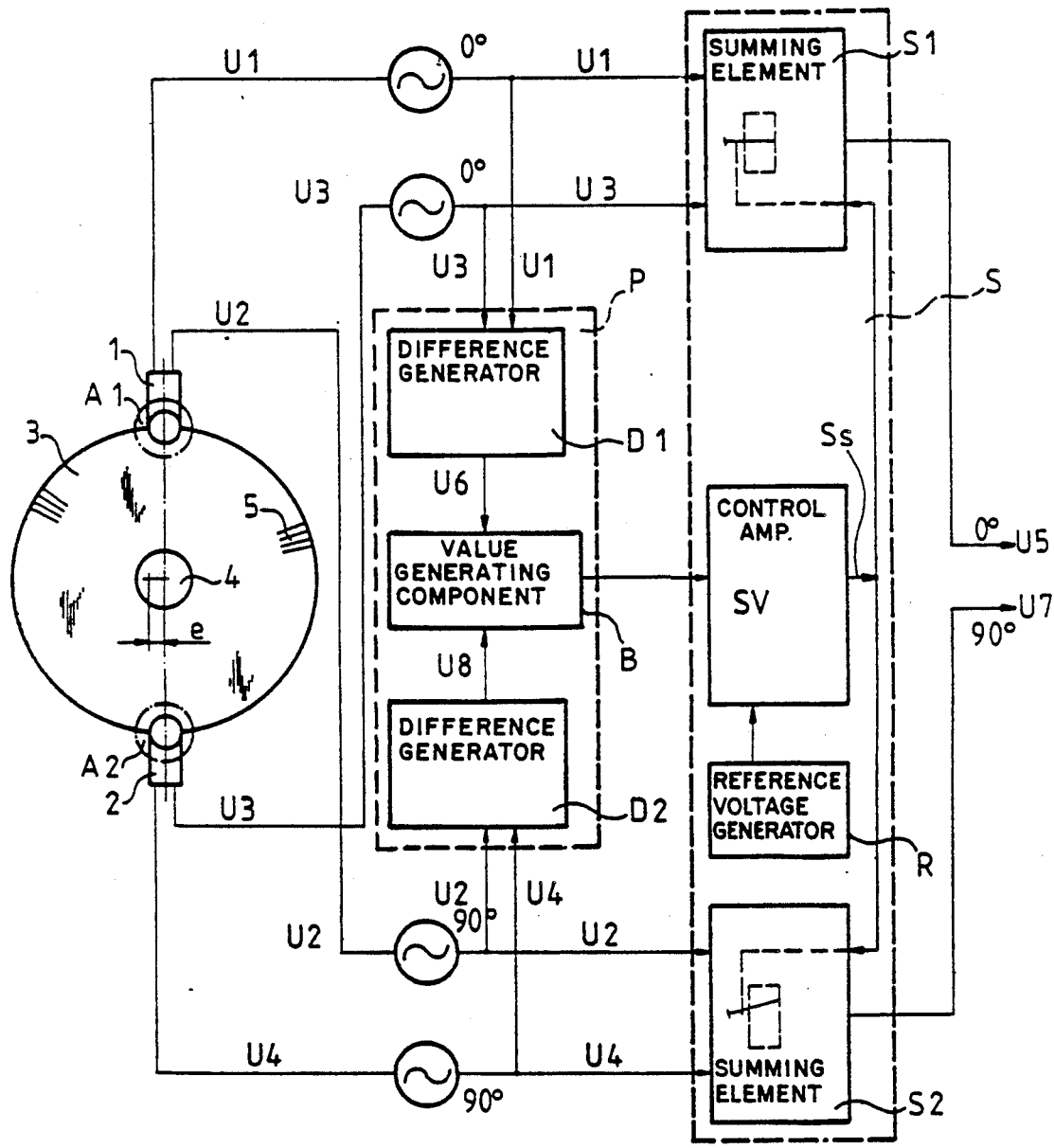
FIG. 1 illustrates a preferred embodiment, in block diagram form, of a position measuring apparatus which includes two scanning devices.

Referring now specifically to FIG. 1, a preferred embodiment of the present invention includes two scanning devices 1 and 2 which scan a graduated plate 3 of a rotational drive (not represented in detail) at scanning locations A1 and A2. The graduated plate 3 is fastened to a shaft 4 and includes an incremental graduation 5. The graduated plate 3 has an eccentricity "e" relative to the shaft 4.

Scanning device 1 generates scanning signals U1 and U2 which are phase shifted by 90° relative to each other. Similarly, scanning device 2 generates scanning signals U3 and U4 which are phase shifted by 90° relative to each other. Conventionally known techniques are then used to determine the rotational direction of the graduated plate 3 from the phase displacement of the scanning signals U1 and U2.

Since the scanning devices 1 and 2 lie diametrically opposite to one another, the scanning locations A1 and A2, which correspond to scanning devices 1 and 2, respectively, are referred to as being spatially displaced by 180°.

The scanning signals U1 and U3 are analog added to provide an average value for the signals. Similarly the scanning signals U2 and U4 are analog added to provide an average value. The average values are used in the measurement of the rotational angle of the graduated plate 3. Under normal conditions, use of this average value reduces the effect of the eccentricity "e" on the measurement.

However, as discussed above, the reliability of the measurements made by double-scanning devices is limited when the eccentricity "e" is caused by jarrings, severe accelerations caused by impacts or the like to briefly exceed an admissible limit. These conditions may cause erroneous countings of the incremental graduation 5, particularly in an extreme case where the scanning signals U1 and U3, and U2 and U4 may even cancel each other entirely.

The results of erroneous countings are best illustrated in the phase diagrams of FIGS. 5a–5e which illustrate analog addition of the scanning signals U1 and U3. In each of the individual FIGS. 5a–5e the scanning signals U1 and U3 have a different arbitrarily chosen phase displacement. In each of FIGS. 5a–5e the signals which would result from available state of the art devices are represented with broken lines Sr and the signals which would result from a device incorporating the measurement apparatus of the present invention are represented with solid lines Sr'.

FIG. 5a illustrates a case wherein the scanning signals U1 and U3 of the scanning devices 1 and 2 have no phase displacement. The two scanning signals U1 and U3 are added such that the sum of U1 and U3 totals 2·U1 which results in a correct measurement value.

FIG. 5b illustrates a case wherein the phase displacement (2α) between the scanning signals U1 and U3 is approximately 60°. The resulting signal Sr has a value of 2·U1 cos 30°. In this case, this phase displacement is still within an admissible tolerance range.

The phase diagrams illustrated in FIGS. 5c–5e illustrate interference cases in which the resulting signal Sr successively worsens. In the extreme case, illustrated in FIG. 5e, extinction between the two signals occurs, clearly resulting in an erroneous measurement.

Figure 5:
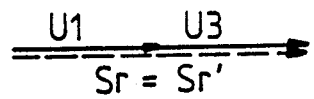
FIGS. 5a–5e are vectorial representations of the resulting signals from the scanning voltage signals from a double-scanning measuring apparatus.
Figure 5:
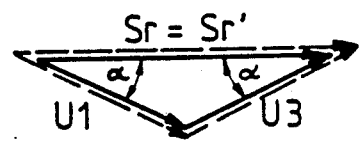
Figure 5:
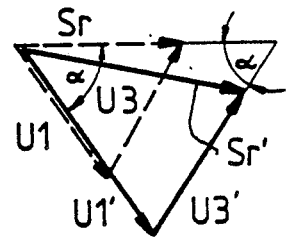
Figure 5:
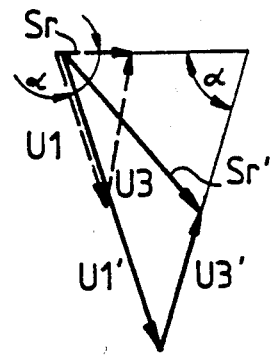
Figure 5:
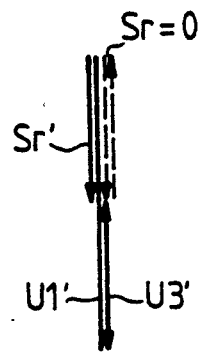

To remedy erroneous measurements resulting from such interference cases, the present invention contemplates unequally weighting the scanning signals from the different scanning locations when these interference cases occur. In the preferred embodiment illustrated in FIG. 1, electrical circuits are provided to determine when an interference condition occurs and to implement the unequal weighting of the scanning signals. The unequal weighting arrangement will produce acceptable resulting signals, even in the above mentioned interference cases, as illustrated in FIG. 5 with resulting signal Sr'.

In the preferred embodiment, the 0° scanning signal U1 of the first scanning device 1 and the 0° scanning signal U3 of the second scanning device 2 are transmitted to a difference generator D1. The difference generator D1 generates a signal U6 corresponding to the difference between the two 0° scanning signals U1 and U3. Similarly, the two 90° scanning signals U2 and U4 are transmitted to a second difference generator D2 which generates a signal U8 corresponding to the difference between the two 90° scanning signals U2 and U4.

The two 0° scanning signals U1 and U3 are transmitted to a first summing element S1 and the 90° scanning signals U2 and U4 are transmitted to a second summing element S2. The summing elements, S1 and S2, are described in more detail below.

Figure 2:
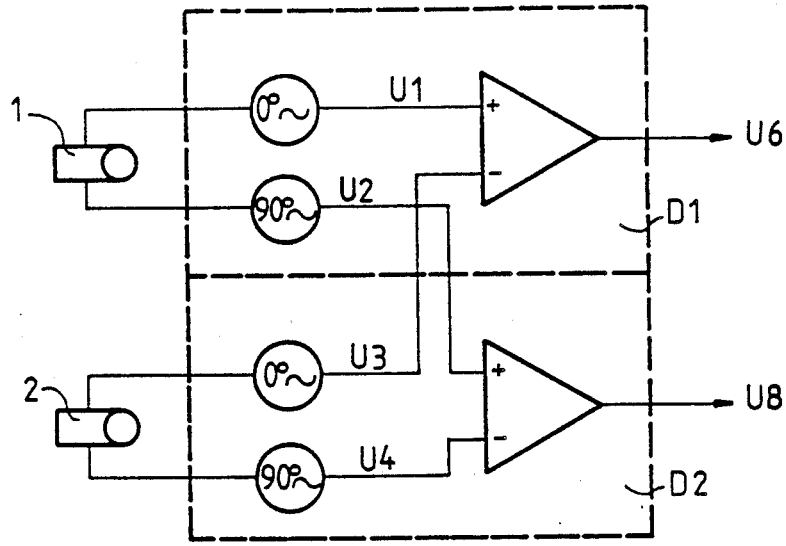
FIG. 2a illustrates a preferred embodiment, in block diagram form, of a difference generator circuit for a position measuring apparatus which includes two scanning devices.
FIG. 2b illustrates a preferred embodiment, in block diagram form, of a difference generator circuit for a position measuring apparatus which includes four scanning devices.
Figure 2:
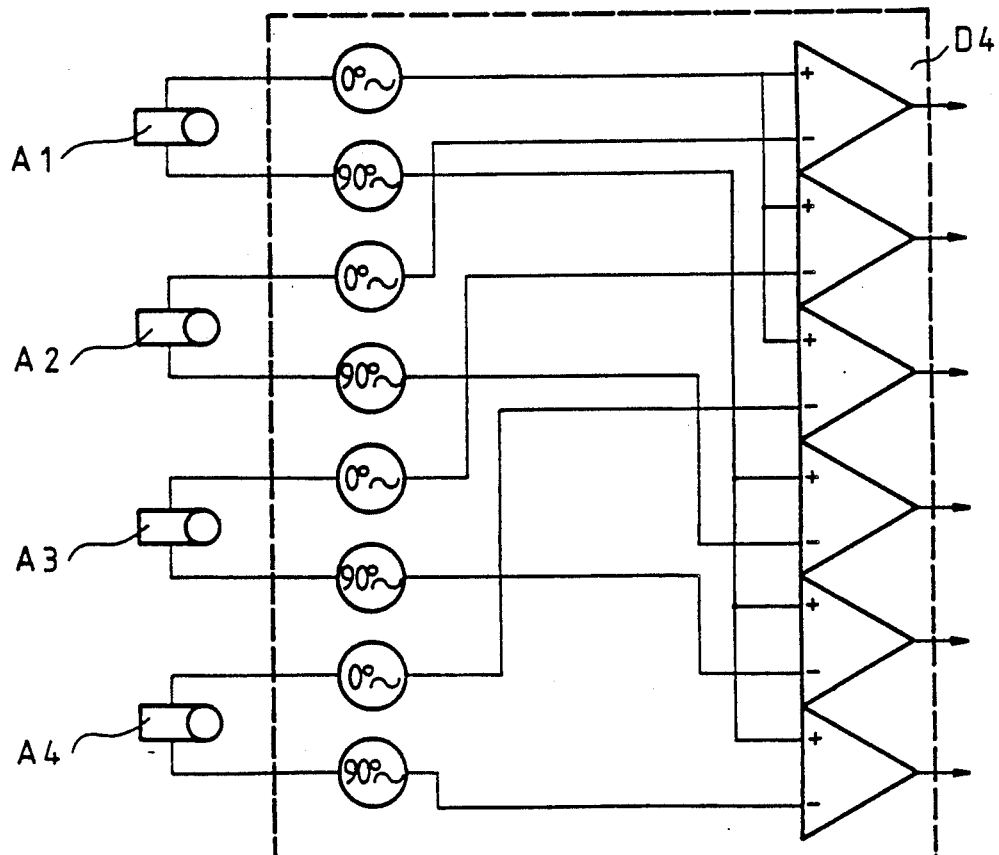

FIG. 2a schematically represents an exemplary embodiment of the difference generators D1 and D2 which are responsive to the scanning signals from the two scanning devices 1 and 2. As will be recognized by those skilled in the art, the difference signals U6 and U8, generated by difference generators D1 and D2 respectively, are also phase-displaced by 90° relative to each other.

FIG. 2b illustrates a difference generator D4 such as would be required in an embodiment in which a rotational drive incorporates four scanning locations, A1 to A4. In this embodiment, a "main scanning location" is selected and a difference signal is generated between the signals from the other scanning locations and the signal from the main scanning location. As illustrated in FIG. 5b three 0° and three 90° difference signals are generated for this arrangement. If the eccentricity is 0, then the resulting signal differences will also be 0.

After the difference is generated by the difference generators D1 and D2, the 0° and 90° difference signals U6 and U8 are transmitted to the value-generating component B. The value-generating component B generates a value corresponding to the difference signals U6 and U8.

Figure 3:
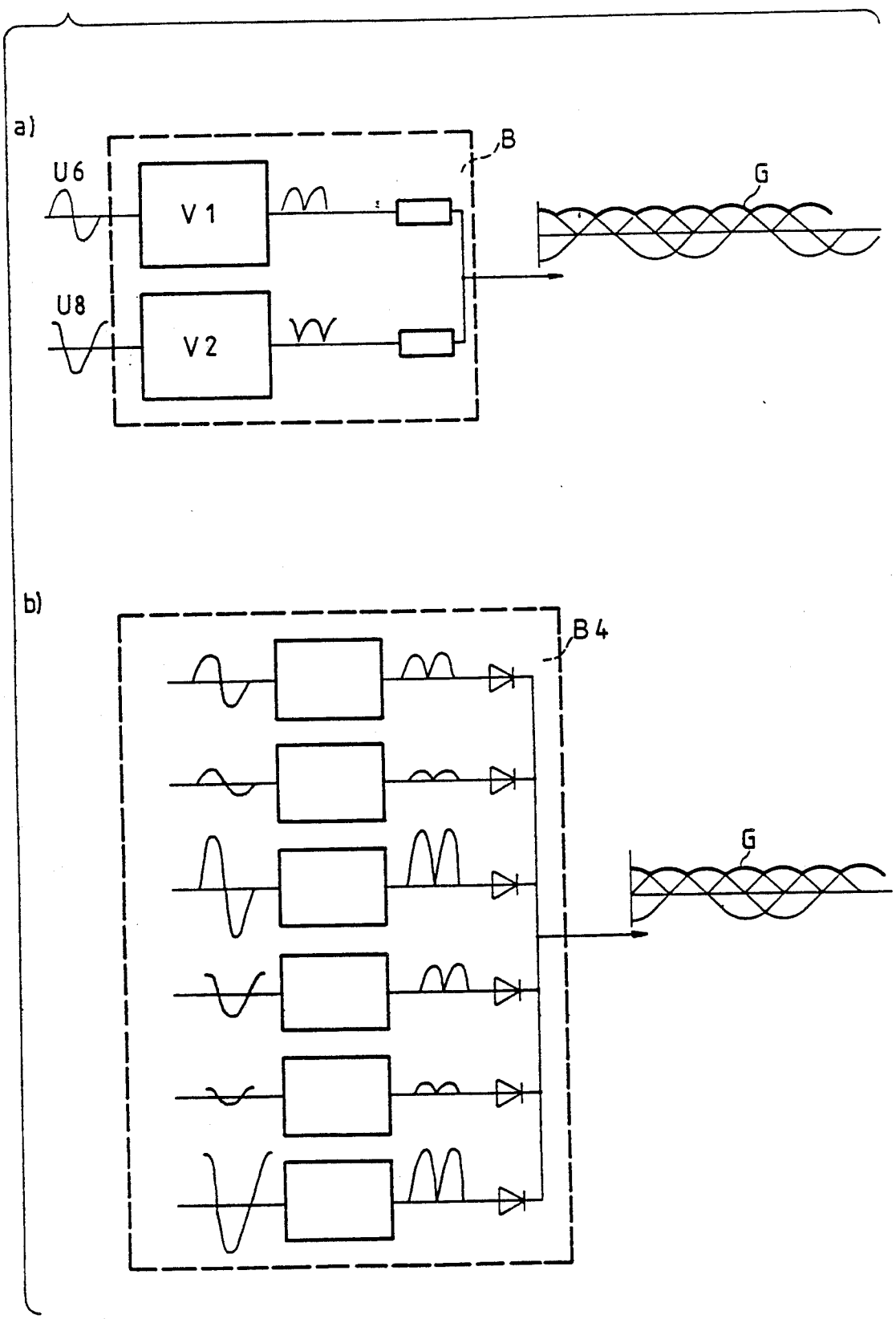
FIG. 3a illustrates a preferred embodiment, in block diagram form, of a value-generating circuit for a position measuring apparatus which includes two scanning devices.
FIG. 3b illustrates a preferred embodiment, in block diagram form, of a value-generating circuit for a position measuring apparatus which includes four scanning devices.

Referring to FIG. 3a, in a preferred embodiment the value-generating component B comprises a circuit including full-wave rectifiers V1 and V2 which produce full-wave rectification of the difference signals U6 and U8, respectively. Since full-wave rectification is well-known in the art no details are given here. After full wave rectification of the difference signals U6 and U8, the rectified signals are summed such that they produce a pulsating voltage which includes a direct voltage component G. The magnitude or height of the direct voltage component corresponds to the eccentricity "e".

FIG. 3b schematically illustrates a value-generating component B4 which may be used for example in an embodiment in which the rotational drive includes four scanning locations (not shown).

In another preferred embodiment, the value-generation may be implemented by squaring and summing the signals U6 and U8. This implementation will also yield a signal whose magnitude depends on the eccentricity "e."

The magnitude of the value generated by the value-generating component B, which depends on the eccentricity "e", is then transmitted to a control amplifier SV which has a defined response wave. The response wave is preferably transmitted in the form of a reference voltage from a component R. If the value of the magnitude from the value-generating component B exceeds a predetermined value, the control amplifier SV generates a control voltage Ss which is in turn transmitted to the summing elements S1 and S2. The control amplifier SV can either switch in discrete steps or function in a continuous manner.

Figure 4:
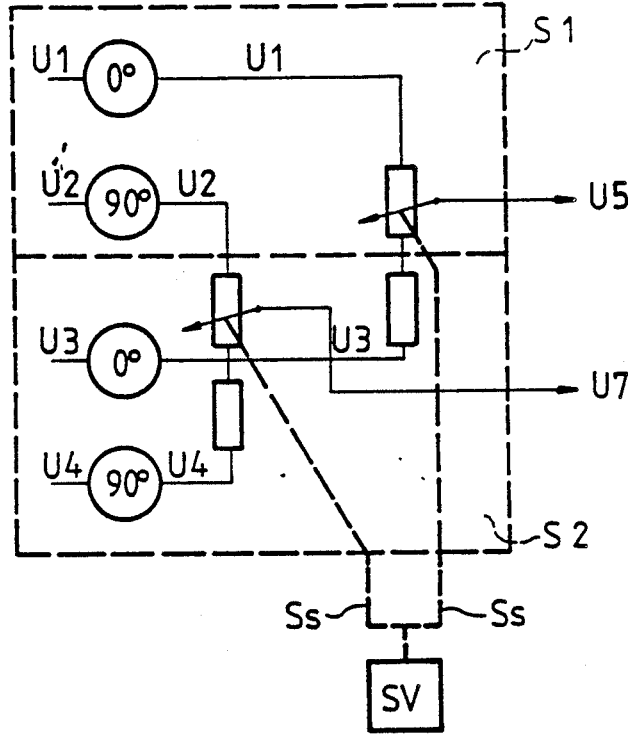
FIG. 4a illustrates a preferred embodiment, in block diagram form, of a weighted summing circuit for a position measuring apparatus which includes two scanning devices.
FIG. 4b illustrates a preferred embodiment, in block diagram form, of a weighted summing circuit for a position measuring apparatus which includes four scanning devices.
Figure 4:
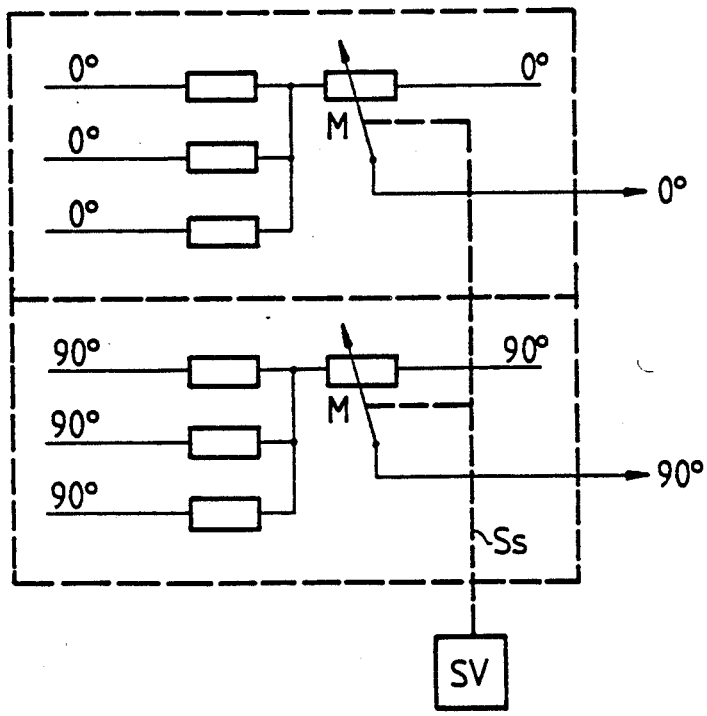

Referring now specifically to FIG. 4a, the scanning signals U1, U2 from the first scanning device 1 and the scanning signals U3, U4 from the second scanning device 2 are added by the summing elements S1 and S2, such that the 0° scanning signals U1 and U3 are added by summing element S1 and the 90° scanning signals U2 and U4 are added by the summing element S2. In addition, the summing elements S1 and S2 weight the sum from the 0° scanning signals and the sum from the 90° scanning signals according to the control voltage signal Ss from the control amplifier SV. The weighted sum of the 0° scanning signals and the 90° scanning signals is generated by the summing elements as signals U5 and U7, respectively.

Preferable, the weighting of the signals is implemented by an electrically controllable resistance element (for example an FET or a four-quadrant multiplier). The drive voltage of the electrically controllable resistance is preferably delivered from the control amplifier SV in the form of the control voltage Ss.

In another exemplary embodiment the signals from the scanning locations may be weighted by varying the energy supplied to the scanning devices at the different scanning locations A1 and A2.

FIG. 4b illustrates a summing element for a rotational drive which includes four scanning locations A1 to A4 from which those skilled in the art may implement the circuit for such a multiple scanning location device.

Thus, the signals U1, U3 and U2, U4 of the individual scanning locations A1 and A2 are analog added analog by the summing elements S1 and S2. The control voltage Ss from the control amplifier SV unequally, weights the signals in the addition process. In an exemplary embodiment, the component of the scanning signals of the main scanning location is increased while the component of the signals from the other scanning locations are simultaneously decreased, thereby preventing signal cancellations. The position measuring apparatus of the present invention, thus, provides an arrangement in which the scanned increments of the graduation 5 of the graduated plate 3 are reliably counted.

It will be recognized by those skilled in the art that the invention can also be used in linear measuring devices. For example, the present invention may be useful in length measuring devices which require several scanning devices in which the measurement embodiments are arrayed on one another in order to achieve the required measurement length.

The present invention may also be used in code measuring arrangements if the track with the highest resolution (finest track is an incremental track) is doubly scanned in the manner described above.

The foregoing description of the preferred embodiments of the present invention has been presented for purposes of illustration and description. They are not intended to be exhaustive or to limit the invention to the precise forms disclosed, and obviously many modifications and variations are possible in light of the above teachings. The embodiments were chosen and described in order to best explain the principles of the invention and its practical applications to thereby enable others skilled in the art to best utilize the invention in various embodiments and with various modifications as are suited to be particularly used as contemplated. It is intended that the scope of the invention be defined by the following claims, including all equivalents.

We claim:

1. In a position measuring apparatus including a measurement embodiment, and a plurality of scanning devices arranged to scan said measurement embodiment at a plurality of different scanning locations, each of said scanning devices generating scanning signals corresponding to each of said scanning locations, wherein the improvement comprises:
    evaluating circuit means including a testing circuit for evaluating said scanning signals from said scanning locations and detecting the occurrence of predefined conditions from said scanning signals; and
    weighting means for unequally weighting said scanning signals from said different scanning locations when said testing circuit evaluates said scanning signals and detects the occurrence of at least one of the following conditions (a) the phase displacement between said scanning signals from said different scanning locations exceeds a predetermined tolerance range, and (b) the amplitude of the sum of the signals from said different scanning locations exceeds a predetermined tolerance range.

2. The position measuring apparatus of claim 1 wherein weighting means comprises a control member.

3. The position measuring apparatus of claim 2 wherein said control member includes a control amplifier responsive to said testing circuit, and a plurality of summing elements for providing the sum of the signals from said different scanning locations and wherein said summing elements are further responsive to said control amplifier such that said summed signals are weighted in response to said control amplifier.

4. The position measuring apparatus of claim 1 wherein said testing circuit includes a plurality of difference generators for providing the difference between said scanning signals from said different scanning locations, and a value-generating component responsive to said difference generators.

5. The position measuring apparatus of claim 4 wherein said value-generating component comprises a full-wave rectifier.

6. The position measuring apparatus of claim 3 wherein said summing elements comprise electrically adjustable resistors.

7. The position measuring apparatus of claim 1 wherein said weighting means comprises means for controlling energy supplied to said scanning elements.

* * * * *

UNITED STATES PATENT AND TRADEMARK OFFICE
CERTIFICATE OF CORRECTION

PATENT NO. : 4,990,767
DATED     : February 5, 1991
INVENTOR(S) : Alfons Ernst, et. al.

It is certified that error appears in the above-indentified patent and that said Letters Patent is hereby corrected as shown below:

Title page:
    Item [30] under Foreign Application Priority Data, delete "3726260" and substitute therefor --3726260.2-52--.
Column 1, line 16, after "taught" insert --,--.
Column 1, lines 60 and 61, delete "double scanning" and substitute therefor--double-scanning--.
Column 2, line 33, after "errors" insert --,--.
Column 2, line 37, delete "for" and substitute therefor--forth--.
Column 3, line 31, after "Similarly" insert --,--.
Column 3, line 63, after "2-U1" insert --,--.
Column 4, line 28, after "are" insert --also--.
Column 4, line 38, after "D2" insert --,--.
Column 4, line 48, after "5b insert --,--.
Column 4, lines 63 and 64, delete "full wave" and insert --full-wave--.
Column 5, line 2, delete "used for example" and insert used, for example--.
Column 5, line 36, delete "Preferable" and insert --Preferably--.
Column 5, line 38, after "example" and insert --,--.
Column 6, claim 1, line 17, after "conditions" insert --:--.

Signed and Sealed this

Seventh Day of June, 1994

Attest:

BRUCE LEHMAN

*Attesting Officer*      *Commissioner of Patents and Trademarks*